No. 620,746. Patented Mar. 7, 1899.
A. C. CREHORE & G. O. SQUIER.
MEANS FOR IMPRESSING SEMI-CYCLES OF ELECTROMOTIVE FORCE ON ELECTRIC CIRCUITS.
(Application filed Jan. 4, 1899.)

(No Model.) 7 Sheets—Sheet 1.

Fig. 1.

Witnesses:
C. L. Belcher
W. H. Capel

Inventors
Albert C. Crehore
George O. Squier
By
Attorney

No. 620,746. Patented Mar. 7, 1899.
A. C. CREHORE & G. O. SQUIER.
MEANS FOR IMPRESSING SEMI-CYCLES OF ELECTROMOTIVE FORCE ON ELECTRIC CIRCUITS.
(Application filed Jan. 4, 1899.)

(No Model.) 7 Sheets—Sheet 2.

Witnesses:
C. L. Belcher
Wm H. Capel.

Inventors
Albert C. Crehore
George O. Squier
By
Attorney

No. 620,746. Patented Mar. 7, 1899.
A. C. CREHORE & G. O. SQUIER.
MEANS FOR IMPRESSING SEMI-CYCLES OF ELECTROMOTIVE FORCE ON ELECTRIC CIRCUITS.
(Application filed Jan. 4, 1899.)

(No Model.) 7 Sheets—Sheet 4.

Witnesses
*Inventors*
Albert C. Crehore
George O. Squier
BY
Attorney

No. 620,746. Patented Mar. 7, 1899.
A. C. CREHORE & G. O. SQUIER.
MEANS FOR IMPRESSING SEMI-CYCLES OF ELECTROMOTIVE FORCE ON ELECTRIC CIRCUITS.
(Application filed Jan. 4, 1899.)
(No Model.) 7 Sheets—Sheet 5.

Witnesses:
C. H. Belcher
Wm H. Capel

Inventors
Albert C. Crehore
George O. Squier
By
H. Townsend
Attorney

No. 620,746. Patented Mar. 7, 1899.
A. C. CREHORE & G. O. SQUIER.
MEANS FOR IMPRESSING SEMI-CYCLES OF ELECTROMOTIVE FORCE ON ELECTRIC CIRCUITS.
(Application filed Jan. 4, 1899.)
(No Model.) 7 Sheets—Sheet 6.

Witnesses:
C. L. Belcher
Wm H. Capel

Inventors
Albert C. Crehore
George O. Squier
By
J. C. Townsend
Attorney

No. 620,746. Patented Mar. 7, 1899.
A. C. CREHORE & G. O. SQUIER.
MEANS FOR IMPRESSING SEMI-CYCLES OF ELECTROMOTIVE FORCE ON ELECTRIC CIRCUITS.
(Application filed Jan. 4, 1899.)

(No Model.) 7 Sheets—Sheet 7.

Witnesses:
C. L. Belcher
W. H. Capel.

Inventors
Albert C. Crehore
George O. Squier
By
J. C. Townsend
Attorney

UNITED STATES PATENT OFFICE.

ALBERT C. CREHORE, OF HANOVER, NEW HAMPSHIRE, AND GEORGE O. SQUIER, OF THE UNITED STATES ARMY.

MEANS FOR IMPRESSING SEMICYCLES OF ELECTROMOTIVE FORCE ON ELECTRIC CIRCUITS.

SPECIFICATION forming part of Letters Patent No. 620,746, dated March 7, 1899.

Application filed January 4, 1899. Serial No. 701,140. (No model.)

*To all whom it may concern:*

Be it known that we, ALBERT C. CREHORE, a citizen of the United States, and a resident of Hanover, in the county of Grafton and State of New Hampshire, and GEORGE O. SQUIER, first lieutenant, United States Army, Washington, District of Columbia, have invented certain new and useful Means for Impressing Semicycles of Electromotive Force on Electric Circuits, of which the following is a specification.

The object of our invention is to provide means whereby electromotive forces gradually changing in value from zero through a maximum back to zero may be impressed upon an electric circuit as a series of pulses with any desired time interval or relation and of any desired polarity successively.

A further object of our invention is to provide a simple and effective means for developing in each of two separate circuits a set of connected semicycles or pulses of electromotive force, those in each circuit being all of the same sign and synchronous with but opposite in sign to those in the other.

The invention is especially useful for the transmitting end of a telegraph employing the code or any other system of transmission, but is not limited to such use.

Our invention consists, first, in the combination, with alternating-current-generating apparatus producing two sets of alternating-current electromotive forces changing in form or value in the desired manner and of the same periodicity, of circuit making and breaking devices controlling the connection of said generating apparatus with a circuit and adapted to make and break circuit at approximately zero instants of current flow, so as to impress said electromotive forces on the circuit and cause pulses of current in any desired arrangement or time relation and with immediately-succeeding pulses of the same or opposite polarity, as desired.

In carrying out the invention we prefer to employ a perforated tape as the means for controlling the times or instants of make and break of circuit, said tape preferably operating in conjunction with a circuit-closing spring or finger which makes contact through the perforations in the tape and breaks circuit when riding on the tape; but other forms or construction of devices may be used for the same purpose.

We also prefer to employ a dynamo generating apparatus for producing the electromotive forces, since this is a convenient and simple device far superior to batteries and current-reversers, while, moreover, the natural form of electromotive force produced thereby, graphically expressed, is of sine-wave form, which we have discovered to be of great value in increasing the practical speed of code-telegraphs, both land and submarine.

The two sets of alternating electromotive forces which are of the same periodicity may be of any relative phase and even of the same phase; but we prefer to have them differ in phase by one semicycle for reasons to be hereinafter more fully explained. They may be generated in different portions of the same divided coil or in different coils operating in the same or different magnetic fields and wound on the same or different structures, as will be obvious to those skilled in the art of dynamo construction.

Our invention consists, further, in the combination, with an alternating-current dynamo-generator developing two sets of electromotive forces of sine-wave type, preferably differing in phase by a semicycle, of commutating or circuit-changing appliances adapted to change said electromotive forces into two sets of connected semicycles of the same periodicity all those in one set being of one polarity, and all those in the other set being of the opposite polarity.

Our invention consists, further, in the novel features and special combinations of apparatus recited in the claims at the end of this description.

In the accompanying drawings.

4 shows graphically the electromotive-force conditions in the branches or circuits leading to the two terminals or electrodes of the circuit-controller when the two waves of electromotive force shown in Fig. 2 are converted to the form or conditions employed in our invention when carried out in the preferred manner.

Figure 1:
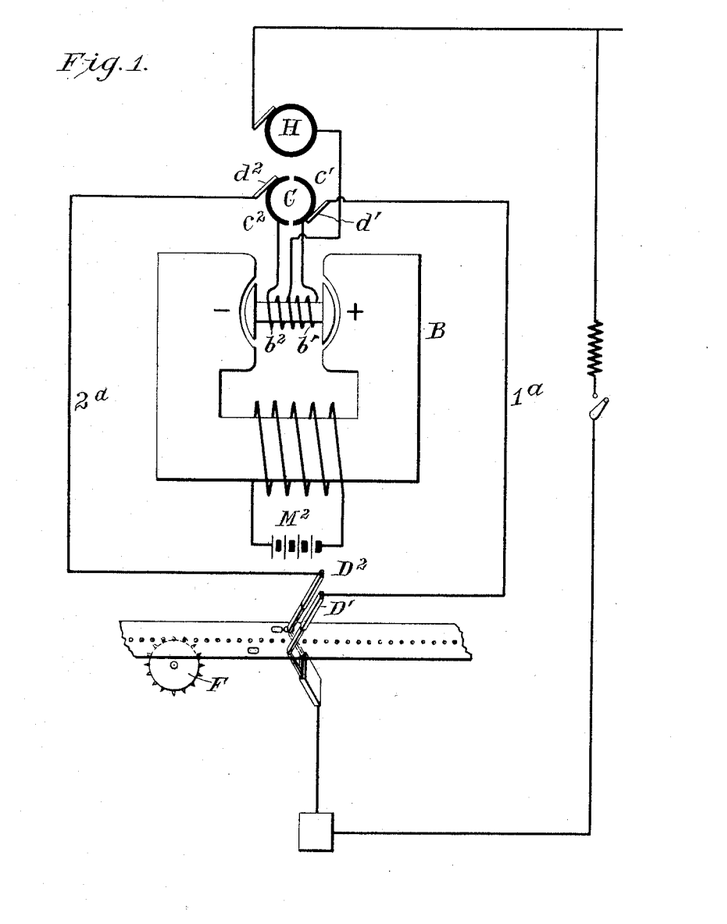
Figure 1 represents in skeleton and diagrammatically a form of apparatus embodying our invention as applied to use for a telegraph transmitting apparatus.
Figure 2:
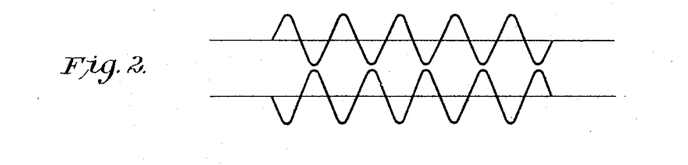
Fig. 2 represents graphically two alternating electromotive forces of sine-wave type and of the same periodicity, but differing in phase by one semicycle, as would be the case in the preferred form of our invention.
Figure 3:
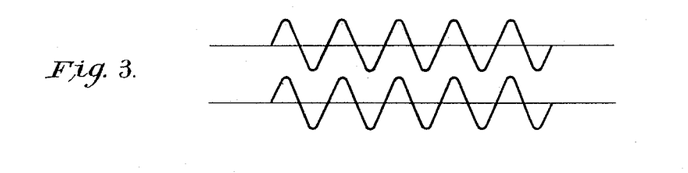
Fig. 3 shows the same, but with the two waves coinciding in phase. Fig.

Referring to Fig. 1, $b'$ $b^2$ indicate two generating-coils or sections of generating-coil adapted to produce at the separated or opposite terminals, respectively, electromotive forces of the same periodicity, but of opposite sign, respectively, so as to differ in phase by a half-wave length or one semicycle. These electromotive-force conditions are indicated graphically in Fig. 2. The said coils may be wound on the same or different structures, operate in the same or different magnetic fields, and each terminal or coil may alternate in polarity any number of times in each cycle of operations of the generating apparatus or in each revolution of the shaft when the said coil is a part of the dynamo-machine. They are here shown as part of a dynamo-generator B and as adapted to generate an alternating electromotive force of sine-wave form or approximately sine-wave form, such as indicated in Fig. 2. The coils are shown as wound on a shuttle form of armature which is adapted to be rotated in a magnetic field which would give one complete wave to each coil for each whole revolution. While we show a shuttle form of armature, any other form which will give an electromotive force more closely following the sine-wave form may be used. The field in which the coils operate is maintained in any desired way—as, for instance, by a local generator $M^2$, supplying a field-coil of the machine. The separate terminals of the two coils $b'$ $b^2$ connect, respectively, with the two sides or segments $c'$ $c^2$ of a pole-changer C, which operates synchronously with the generated alternating electromotive forces in any desired manner—as, for instance, by being mounted on the armature-shaft—while the brushes or terminals $d'$ $d^2$ for said pole-changer connect with the wires or circuits $1^a$ $2^a$, which terminate, respectively, in the electrodes, poles, or terminals of any circuit-controlling device or circuit making and breaking appliance, by means of which either circuit may be connected for any number of half-wave intervals with the circuit on which the generated pulses of electromotive force are to be impressed and may then be disconnected therefrom, the instant of make and of break being timed to coincide with the instant the current flow on said circuit is zero. The opposite terminal of the coils $b'$ $b^2$, here shown as a divided coil or as having a common terminal, joins through a collector ring and brush H with the opposite pole of the circuit on which the pulses of electromotive force are to be impressed. In the present case and for purposes of illustration we have shown circuits $1^a$ and $2^a$ as terminating in the brushes $D'$ $D^2$ for one form of telegraph-transmitter in which a perforated tape is employed and wherein, as well understood in the art, the circuit is closed through a perforation in the tape and is broken when the contact finger or spring passes out of the perforation onto the tape. For telegraphic purposes the terminals $D'$ $D^2$ could engage through the tape with a contact or contacts connected to earth, as indicated, the opposite terminal of the generator being connected with the line or cable through ring and brush H.

By means of the pole-changer the two sets of alternating electromotive forces indicated in Fig. 2 are connected into two sets of connected semicycles of the same periodicity on the two circuits or branches $1^a$ $2^a$, respectively, all those in one set or circuit being of one polarity or sign and all those in the other set or circuit being of the opposite polarity or sign. This electromotive-force condition of the circuits and their terminals $D'$ $D^2$ we graphically show in Fig. 4. By this means there is continuously present at the circuit-controller, at each unit of time or generated half-wave of alternating electromotive force, an electromotive-force condition of both signs, thus furnishing a semicycle of either sign at each instant ready to be impressed on the circuit. Hence said semicycles may be impressed upon the circuit at any instant, singly and of either polarity, or may be impressed as a succession of impulses two or more in number, with the successive pulses all of the same sign or successively alternating in any desired way throughout the series. Some of the various ways in which this may be done are indicated graphically in Fig. 5, which shows the order or relation of pulses as to time interval and polarity in the circuit upon which they are impressed. For illustration we show the order or succession which would be employed in transmitting some of the characters of the alphabet by the international code, to be recorded at the receiving end of the line by a siphon recorder or other instrument responsive to the separate pulses, the unit-spaces where no semicycle or pulse appears indicating the suppression of both pulses of generated electromotive force at that unit instant of time and corresponding to the space between characters in the transmitted message.

Figure 7:
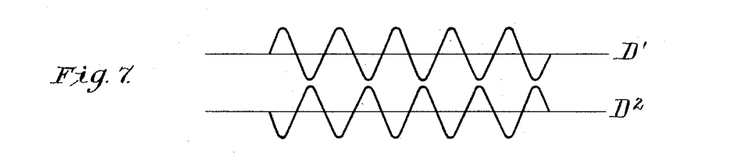
Fig. 7 shows graphically a modification in the electromotive-force conditions at the two terminals of the circuit-controller.
Figure 8:
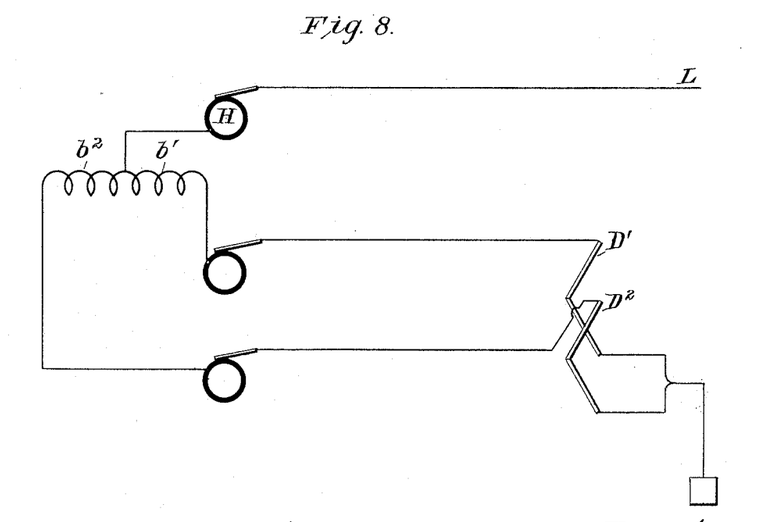
Fig. 8 shows diagrammatically and in skeleton the generating-coils, connections, and apparatus that might be used for producing the condition indicated in Fig. 7.

It is not necessary to use the pole-changer whereby semicycles of electromotive force of one sign only are present at each brush or terminal of the transmitting-tape or other device, as said brushes might each be connected directly with one of the coils $b'$ $b^2$ through a ring or other continuous connection, as indicated in Fig. 8, so that the electromotive force at the two brushes or terminals would alternate, as indicated in Fig. 7. By the former arrangement if a connected series of semicycles of successively-opposite sign are to be transmitted they would go to line successively, first through one brush or terminal and then through the other brush or terminal, while in the latter arrangement they would go through one of the brushes only, the other in the meantime riding upon the paper, the brush selected for the purpose being in any case the one which would first give an initial semicycle of the desired sign. If the semicycles to be transmitted in immediate succession are of the same polarity, they would in the former case go all by the same brush or terminal, while in the latter case they would go first by one brush and then by the other. We prefer, however, the former arrangement, in which each brush or terminal is of a given or the same polarity during every unit of time occupied in the generation of one semicycle, and the same brush may therefore be used at any instant to transmit a semicycle of the desired or same polarity, whereas in the latter case it would be sometimes necessary, assuming the same brush or terminal to be always used for semicycles of the same sign in the transmission of a message, to delay one semicycle to permit the brush to assume the desired polarity or else to send the desired combination of semicycles by beginning with the opposite brush, which would be obviously objectionable because involving want of uniformity in the use of the terminals or the arrangement of perforations for sending the same character. By the first-named plan the arrangement of perforations is always the same for the same character, while at the same time the utmost possible value is given to each semicycle or unit of time in the transmission of a message.

Figure 4:
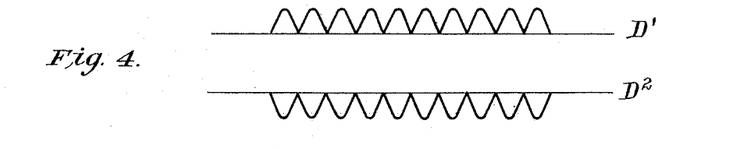
Figure 5:
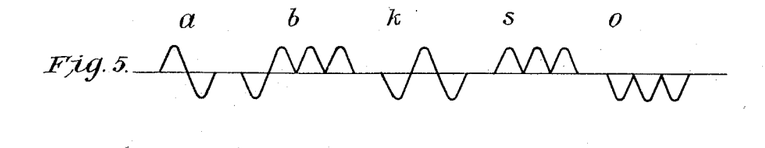
Fig. 5 shows graphically some of the ways in which by means of the circuit-controller the electromotive forces indicated in Fig. 5 may be impressed upon a circuit as to their time relation or order of succession and as to polarity.
Figure 6:
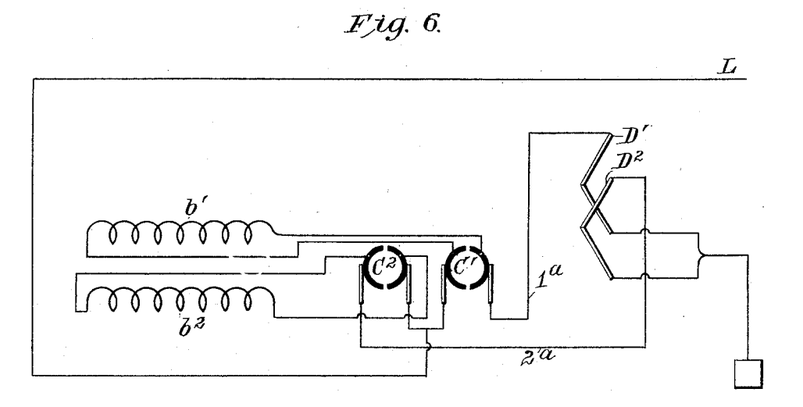
Fig. 6 shows diagrammatically generating-coils and circuit-changers that might be used in producing the electromotive-force conditions graphically illustrated in Figs. 3 and 4.

While we prefer to organize the generating appliance so that it produces alternating electromotive forces displaced in phase by a half-wave length, it may be organized to produce alternating electromotive forces of the same phase, with the disadvantage, however, that in order to produce the condition indicated in Fig. 4 in the two circuits $1^a$ and $2^a$ it would be necessary to employ the two pole-changers $C'$ $C^2$, as indicated in Fig. 6, each being provided with two brushes connected, respectively, to one of the circuits $1^a$ $2^a$ and to line, as shown. The coils $b'$ $b^2$ being connected to the segments of $C'$ $C^2$, as shown, and the latter being arranged upon their shaft in phase with one another, an electromotive-force condition such as indicated in Fig. 4 may be produced at the two terminals $D'$ $D^2$.

It will of course be understood that when the circuit is controlled by a perforated tape and brushes, such as $D'$ $D^2$, riding thereon the said tape must be fed at a speed synchronous with the generation of the alternating electromotive force and that the unit of linear space in the tape occupied by perforations should be the space fed under the brush during the production of one semicycle. For this purpose the tape is provided with a central row of feeding-perforations, as well understood in the art, to be engaged by a toothed wheel F, which runs in synchronism with the generator B. The length of each perforation being made to correspond to the number of semicycles to be transmitted, the circuit can be broken at the instant when the current is actually zero for that circuit by properly adjusting the brush along the tape. This can be done approximately by adjusting until no spark is visible. The space between perforations being a unit distance or multiple of unit distance determined, as already stated, by the distance of paper fed during the propagation of one semicycle of electromotive force, the instant of make of circuit will coincide approximately with the natural zero of current or instant at which it would be zero had it been allowed to flow uninterruptedly.

Having described the general principles of our invention, we will proceed to describe practical forms of telegraph transmitting apparatus for submarine cables and for land-lines embodying and constituting one application of our invention.

Figure 9:
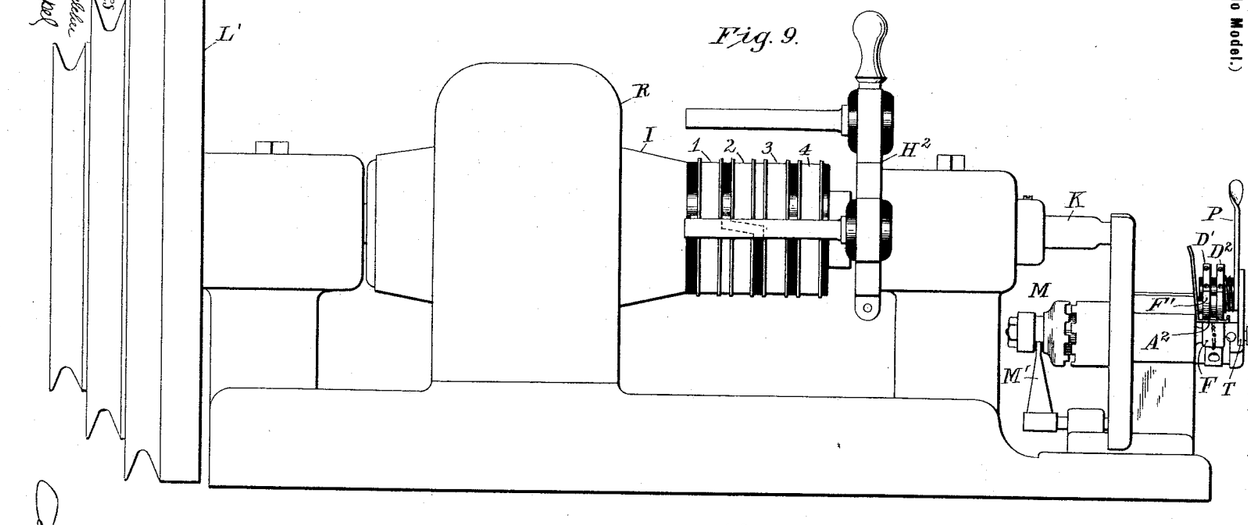
Fig. 9 shows in side elevation a part of a working apparatus embodying our invention and suited for use in submarine telegraphy.

Referring to Figs. 9 and following, we will first describe a form suited for cable use in which the permissible rate of propagation or flow of the distinct transmitted impulses is comparatively limited.

I is an armature of a dynamo-electric machine wound or provided with two coils or sections of coil, as already explained, adapted to develop alternating electromotive forces of the same periodicity, and R is a field-magnet for said dynamo, which field-magnet in an apparatus for submarine-cable telegraphs might have two poles only, so that each coil would develop but one whole wave of alternating electromotive force in each revolution.

Figure 16:
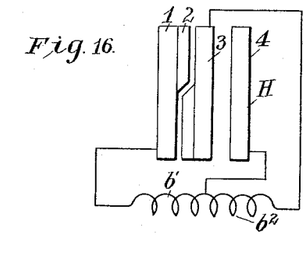
Fig. 16, Sheet 4, is a diagram illustrating the manner of connecting the generator-coils to the collector-rings and circuit changer or reverser.

K indicates the armature-shaft, and L' the driving-pulley. Upon the armature-shaft and properly insulated therefrom are the four contact-rings numbered 1 2 3 4, upon which bear suitable collector-brushes supported from a suitable brush-holder H$^2$. Ring 4 serves for a connection of one or the common terminal of the armature-coil system, as shown in Fig. 16, and corresponds to ring H of the diagram, Fig. 1. Ring 2 is subdivided to furnish the two sides $c'$ $c^2$, Fig. 1, of the pole-changer, upon which bear the two brushes connected to the circuits leading to the terminals D' D$^2$ or other devices. The halves of said ring constitute, in effect, parts, respectively, of the two rings 1 3, which in the operation of the device for the purpose already described are normally idle—that is to say, have no collector-brushes bearing upon them, but have the terminals of the armature-coil system connected directly with them. In the case of a divided coil like that shown in Fig. 1 it is obvious that by the application of suitable brushes to the rings 1 3 an electromotive force (alternating) which is the sum of that furnished from the two sections of coils individually may be obtained.

Figure 10:
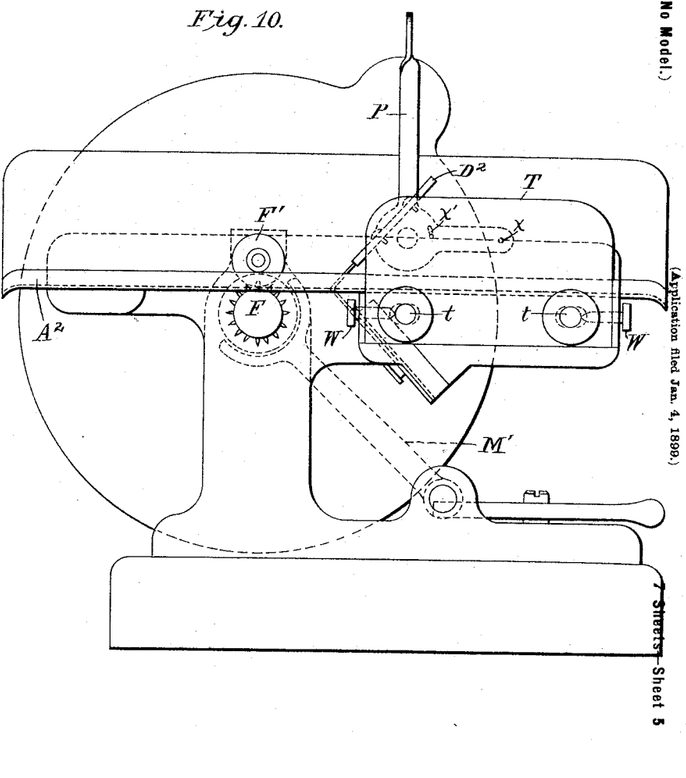
Fig. 10 is an end elevation of the apparatus.

The feed-wheel F for the circuit closing and breaking tape can be driven from the shaft K through a suitable intermediate reducing-gear comprising pinion H$^3$ upon the shaft K, arranged to gear with a wheel H', the hub of which carries one member of the clutch M, the other member of which is carried by the shaft to which the toothed feed-wheel F is secured. A clutch-operating lever M' is provided and connected with the clutch, as clearly shown in Figs. 10, 11, and 12. The faces of the clutch members which engage are formed with teeth or projections to interlock, as shown, so that the relative position of the feed-wheel and armature-coil shall always be the same whenever they are connected together, thereby causing the circuit-controlling devices to be in step or exact phase with the propagation of the alternating electromotive forces and insuring a make and break of circuit at the proper instants, provided that there has been a proper relative adjustment of the circuit-closing fingers to the tape.

The brushes D' D$^2$ are carried on a frame or plate T, supported on pins or studs $t$, which project from a suitable supporting arm or bracket. The frame T is capable of longitudinal adjustment by means of set-screws W, carried by it for the purpose of adjusting the position of the brush-tips with relation to the perforations in the tape, and thereby determining the instant at which circuit shall be broken and made in the alternating-current wave produced by the impressed alternating electromotive force.

Figure 11:
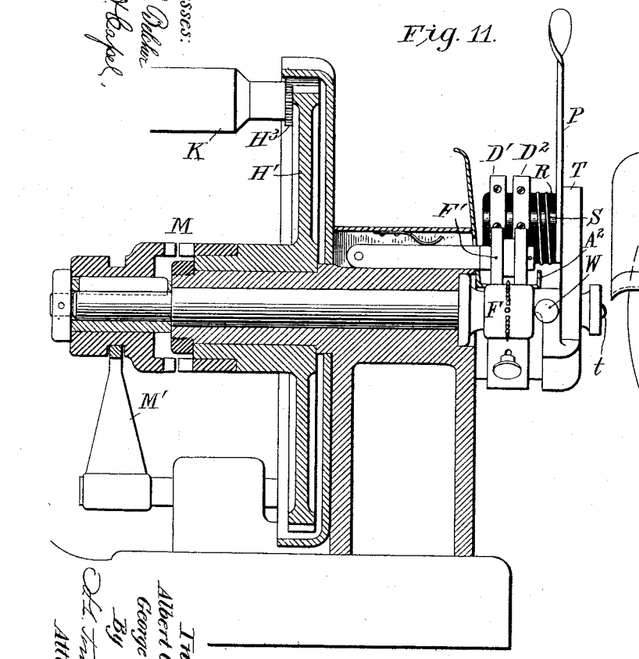
Fig. 11 is a vertical longitudinal section through the parts mechanically connecting the generator and the transmitter or circuit-controller.
Figure 12:
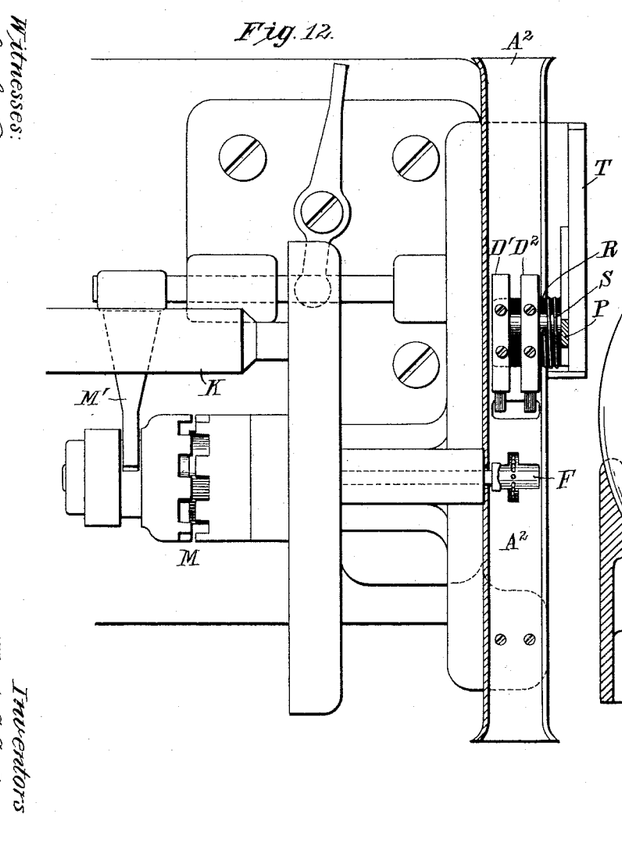
Fig. 12 is a plan of the transmitting or circuit-controlling end of the apparatus.

At F' is indicated a pressure-wheel which keeps the paper strip engaged by wheel F. Wheel F' is supported on a pivoted arm pressed down by a spring, as shown in Fig. 11.

The brushes D' D$^2$ are carried by a rotatable block or hub of insulation R, turning on the pin carried by an elbow-lever P, pivoted at $x$. A spring S is applied to the hub, as shown, and holds the brushes down upon the perforated tape. By manipulating lever P to raise the hub the brushes may be raised from the paper tape or strip. The action of the spring upon the hub when the latter is raised is limited by a stop-pin working in a curved guide or slot, as indicated at $x'$. The paper-feed trough or guide A$^2$ is perforated immediately beneath the tips of the brushes D' D$^2$ to permit them to meet or make contact with other brushes or contact-surfaces beneath the trough, as clearly shown in Fig. 10. Said contact beneath the trough is supported, like contacts or circuit-closers D' D$^2$, by the frame T.

Figure 13:
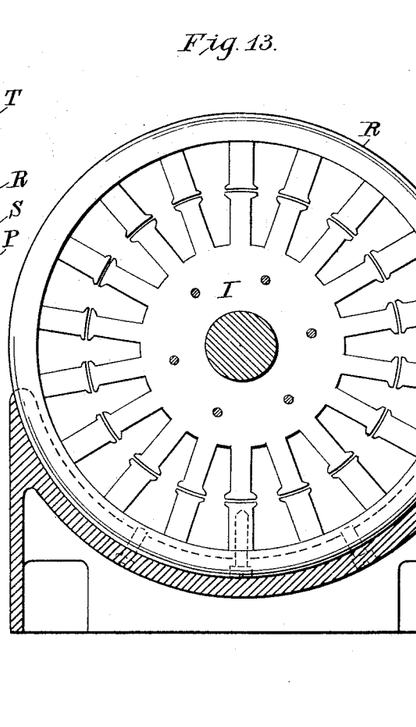
Fig. 13 shows in side elevation the armature and field of the apparatus as modified for use on land lines or where very high periodicity is desired.
Figures 14, 15:
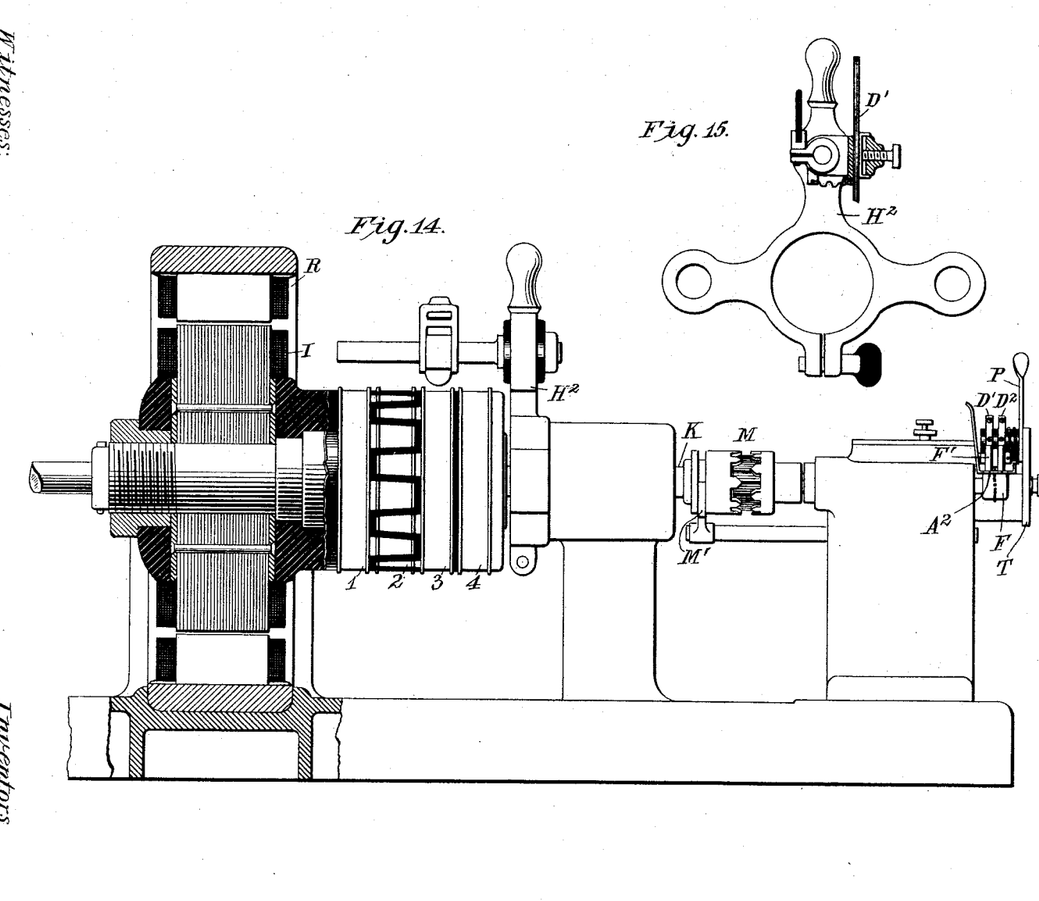
Fig. 14 is a side elevation and partial vertical section of said modified apparatus.
Fig. 15 is a view of the brush-holder in detail.

When the apparatus is to be employed for high-speed systems of telegraphy in which an alternating electromotive force of higher periodicity is required, the construction of the armature and field of the machine may be varied in obvious fashion to follow the lines of present alternating-current-dynamo construction, as clearly indicated in Figs. 13 and 14, in the former of which we show the skeleton of an alternating-current dynamo having eighteen armature-poles and adapted to produce nine whole waves of alternating electromotive force for each revolution.

It will be obvious that in the construction of the apparatus previously described a larger number of alternations might be produced for each revolution of the armature, the speed of the feeding mechanism being changed to the required degree.

In the case of the apparatus illustrated in Figs. 13 and 14 it is obvious that the pole-changing device would have, if it be secured to the armature-shaft as already explained, a correspondingly-increased number of conducting-segments in the ring 2, as clearly indicated in Fig. 14, where each ring 1 and 3 is formed with segments or projections entering between those of the other and making in all eighteen segments to correspond to eighteen semicycles of electromotive force developed in one whole revolution of the armature. The armature may be wound in the ordinary fashion, with its coils connected in continuous series, the terminals being connected, respectively, to rings 1 and 3 and the center of the coil to ring 4. Feed-wheel F could in this case be made to revolve at the same rate as the armature-shaft K, the two members of the clutch M being in this case mounted, respectively, on the shaft K and upon the spindle carrying the said operating-wheel of the circuit-controlling mechanism. By applying the brushes to rings 1 and 3 and removing the brushes that bear on rings 2 and 4 it is obvious that an alternating electromotive force of the ordinary type, but with a value equal to the maximum of that developed in the armature, is available for testing or other purposes upon lines or circuits to which the semicycles of impressed electromotive force are to be applied in the manner already described. In this construction a self-contained machine is available for both purposes.

The broad combination of an alternating-current generator and a synchronously-operating transmitter, such as hereinbefore described, adapted and adjusted to make and break the circuit at the natural zero of the alternating-current waves or pulses, as hereinbefore described, and the use therewith of any instrument, such as a siphon-recorder, which will make a record of the individual pulses, are not claimed here, as they form the subject of our prior application, filed November 9, 1896, Serial No. 611,576. We have also claimed in said application, broadly, the improvement in the art of automatic telegraphy which consists in impressing the characters of a code upon the alternating current by makes and breaks of the circuit adjusted to take place as herein set forth and to transmit or suppress determinate semicycles in definite order or succession in accordance with the code and making by the receiver a visual record showing each pulse transmitted or suppressed.

The improvement in submarine telegraphy which consists in transmitting the signaling waves or pulses by impressing upon the cable electromotive forces which change gradually and continuously from zero through a maximum to zero forms the subject of our prior application, filed October 25, 1898, Serial No. 694,509.

The invention claimed is—

1. In a telegraph transmitting apparatus, the combination with an alternating generator producing two alternating electromotive forces of the same periodicity, of circuit-interrupting devices adapted to make and break circuit at instants when the current flow is actually zero, and to impress said electromotive forces on the circuit so as to cause semicycles of current to flow in the desired order or relation and those in immediate succession to be of the same or opposite sign as desired.

2. In a telegraph transmitting apparatus, the combination with an alternating generator producing two alternating electromotive forces of the same periodicity, of a circuit making and breaking tape adapted to make and break circuit at instants when the current flow is actually zero, and to impress said electromotive forces on the circuit so as to cause semicycles of current to flow in the desired order or relation and those in immediate succession to be of the same or opposite sign as desired.

3. In a telegraph transmitting apparatus, the combination with an alternating generator producing two alternating electromotive forces of the same periodicity, of a transmitting sheet or tape and two contact-fingers operating synchronously with the generator, and having perforations spaced or adjusted, as described, to impress said electromotive forces on the circuit so as to cause semicycles of current beginning and ending at zero to flow in the desired order or relation over the same and of any required sign successively.

4. The combination with a dynamo generating apparatus producing two alternating electromotive forces of sine-wave type and of the same periodicity, of means for delivering said electromotive forces at the transmitter-terminals as two sets of semicycles of electromotive force of continuously the same sign at said terminals respectively, and means for impressing the same upon the circuit for causing complete semicycles of current of either sign to be transmitted beginning and ending at zero and in any desired order or succession.

5. The combination with an alternating-current two-phase generator developing alternating electromotive forces of the sine-wave type and of the same periodicity, of circuit making and breaking devices adapted to make and break circuit at instants of natural zero in the current-flow, and to impress said electromotive forces upon the circuit in any desired order or relation either singly or as a connected series of pulses in which successive pulses are of the same or alternate polarity.

6. The combination with an alternating-current generator producing two sets of alternating-current electromotive forces of the same periodicity, of means for changing said electromotive forces into two connected series of semicycles of electromotive force all of the same polarity in the same series but of opposite polarity in the two series respectively, and circuit making and breaking appliances making and breaking circuit at the zero of current for impressing said electromotive forces on a circuit at any desired intervals and with the immediately-succeeding pulses in each series impressed having the same or an alternating polarity.

7. The combination with an alternating-current generator producing two alternating-current electromotive forces of sine-wave type and of the same periodicity, of commutating or circuit-changing devices for changing said electromotive forces into two sets of connected semicycles on two separate circuits, all the semicycles on each circuit being of the same polarity.

8. The combination with an alternating-current generator producing two electromotive forces of sine-wave type and of the same periodicity, of means for converting said electromotive forces into two sets of connected semicycles on two separate circuits, all of the semicycles in each being of the same polarity.

9. The combination with an alternating-current generator developing two alternating electromotive forces differing in phase by one semicycle, of a pole-changer for changing said electromotive forces into two series of connected semicycles of the same periodicity, all the semicycles in one set being of one polarity and all those in the other set being of the opposite polarity.

10. In a telegraph transmitting apparatus, the combination with an alternating-current dynamo producing two electromotive forces differing in phase by a half-wave length, of circuit-interrupting devices adapted to cut out determinate semicycles of said electromotive forces at instants of zero-current so as to allow semicycles of current to flow upon the circuit in the desired order or succession and of the desired sign.

11. The combination with a two-phase generator of alternating electromotive force producing electromotive forces of sine-wave type differing in phase by one semicycle, of means for delivering said electromotive forces at the transmitter-terminals as two sets of semicycles of electromotive force of continuously the same sign at said terminals respectively, and means for impressing the same upon the circuit for causing the complete semicycles of current of either sign beginning and ending at zero and in any desired order or succession to flow on said circuit.

12. The combination with an alternating-current generator and circuit-controlling devices operating in synchronism therewith, as described, of a clutch for disconnecting the dynamo-shaft from the shaft of the said circuit-controlling devices and formed as described so as to cause them to be kept in step or phase on being again connected.

13. The combination with an alternating-current two-phase generator for developing electromotive forces of sine-wave type differing in phase by a semicycle, of commutating or circuit-changing devices for changing said electromotive forces into two sets of connected semicycles, all of the semicycles of one set being of one polarity and all those in the other set being of the opposite polarity, as and for the purpose set forth.

14. In a transmitting apparatus for telegraphy, the combination of an alternating-current two-phase dynamo producing electromotive force of sine-wave type differing in phase by one semicycle, and a perforated tape or sheet moving synchronously with the dynamo and having perforations so arranged that complete determinate semicycles of the current beginning and ending approximately at zero will be transmitted and suppressed.

15. The combination with a dynamo developing two electromotive forces differing in phase by a one-half-wave length, of three continuous collector-rings one of which is connected to a common terminal of the generating-coils while the other two are connected respectively to the opposite terminals of said coils and themselves terminate in the opposite segments of a pole-changer, whereby as described the machine may be made to deliver two electromotive forces differing in phase or a single electromotive force whose value is the sum of the two which differ in phase.

16. The combination, substantially as described, of a two-phase alternating-current generator, a transmitter operating in synchronism therewith and having two contact-brushes, and pole-changing devices between said brushes and generator for changing the generated alternating electromotive forces into a connected series of semicycles of electromotive force of one polarity at each of said brushes.

17. The combination, substantially as described, of a two-phase alternating-current generator developing electromotive forces differing in phase by one semicycle or half-wave length, a synchronously-operating transmitter, and a pole-changer between the generator and transmitter for changing the two alternating waves of developed electromotive force into two connected series of semicycles of electromotive force of opposite polarity at the two terminals of the transmitter.

Signed at Bristol, in the county of Hartford and State of Connecticut, this 31st day of December, A. D. 1898.

ALBERT C. CREHORE.

Witnesses:
 LAURA B. PENFIELD,
 JOHN J. JENNINGS.

Signed at Washington, in the District of Columbia, this 3d day of January, A. D. 1899.

GEORGE O. SQUIER.

Witnesses:
 MORVEN THOMPSON,
 JAS. R. EDSON.